United States Patent
Clark et al.

(10) Patent No.: US 8,412,404 B2
(45) Date of Patent: Apr. 2, 2013

(54) CRASH SENSOR SYSTEM AND METHOD FOR A VEHICLE

(75) Inventors: Todd Clark, Dearhorn, MI (US); Jialiang Le, Canton, MI (US); Krishnakanth E. Aekbote, Farmington Hills, MI (US); Mahmoud Yousef Ghannam, Canton, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 12/399,527

(22) Filed: Mar. 6, 2009

(65) Prior Publication Data

US 2010/0228424 A1   Sep. 9, 2010

(51) Int. Cl.
   *G06F 7/00*   (2006.01)
(52) U.S. Cl. ........................ 701/31.4; 180/274
(58) Field of Classification Search ............ 701/29, 701/45; 475/120; 340/436; 280/274, 735; 251/129.01; 180/274, 282
   See application file for complete search history.

(56) References Cited

U.S. PATENT DOCUMENTS

| | | | | |
|---|---|---|---|---|
| 7,104,354 B2 * | 9/2006 | Ozaki | | 180/282 |
| 7,445,072 B2 * | 11/2008 | Mattes et al. | | 180/274 |
| 7,484,756 B2 * | 2/2009 | Le et al. | | 280/735 |
| 7,525,416 B2 * | 4/2009 | Mader | | 340/436 |
| 7,605,691 B2 * | 10/2009 | Nonaka et al. | | 340/436 |
| 7,664,609 B2 * | 2/2010 | Adam et al. | | 702/47 |
| 7,768,381 B2 * | 8/2010 | Takafuji et al. | | 340/436 |
| 7,804,414 B2 * | 9/2010 | Kiribayashi | | 340/614 |
| 7,854,453 B2 * | 12/2010 | Tanabe | | 293/102 |
| 2004/0182627 A1 | 9/2004 | Bujak | | |
| 2005/0209756 A1 | 9/2005 | Ueno | | |
| 2006/0021815 A1 * | 2/2006 | Ohtaka | | 180/274 |
| 2006/0064220 A1 * | 3/2006 | Murakami et al. | | 701/45 |
| 2006/0220808 A1 * | 10/2006 | Takahashi | | 340/436 |
| 2007/0227797 A1 | 10/2007 | Takahashi et al. | | |
| 2008/0238641 A1 * | 10/2008 | Mader | | 340/436 |
| 2008/0316008 A1 * | 12/2008 | Takafuji | | 340/436 |
| 2009/0015391 A1 * | 1/2009 | Kiribayashi | | 340/436 |
| 2009/0015392 A1 * | 1/2009 | Takahashi et al. | | 340/436 |
| 2009/0021359 A1 * | 1/2009 | Tanabe | | 340/436 |
| 2009/0024323 A1 * | 1/2009 | Tanabe | | 701/301 |
| 2009/0306857 A1 * | 12/2009 | Katz et al. | | 701/45 |

FOREIGN PATENT DOCUMENTS

DE   10331862 A1 *   2/2005
JP   2007314159 A   6/2007

* cited by examiner

*Primary Examiner* — Faye M Fleming
*Assistant Examiner* — Robert A Coker
(74) *Attorney, Agent, or Firm* — Frank A. MacKenzie; Brooks Kushman P.C.

(57) ABSTRACT

A crash sensor system and method used for determining when a vehicle is involved in a frontal impact crash. The crash sensor system including at least one pressure sensor coupled to a vehicle frame member. The vehicle frame member having a cavity and the at least one pressure sensor being configured to generate a pressure signal indicative of a pressure change within the cavity. The crash sensor system further including a controller configured to compare the received pressure signal against a predetermined pressure threshold. The controller also being configured to determine that a frontal impact crash has occurred when the pressure signal exceeds the predetermined pressure threshold.

20 Claims, 5 Drawing Sheets

CRASH SENSOR SYSTEM AND METHOD FOR A VEHICLE

BACKGROUND

1. Technical Field

One or more embodiments of the present application relate to a crash sensor system and method that may be used to determine when a vehicle is involved in a frontal impact crash.

2. Background Art

In 1978 the U.S. National Highway Traffic Safety Administration (NHTSA) began crash-testing vehicles sold throughout the United States. The crash-test protocol involved running the vehicles head-on into a fixed barrier at 35 M.P.H. Under the New Car Assessment Program (NCAP), the results of these crash-tests were published for consumers to review under what is commonly referred to as the NHTSA star rating scale. The NHTSA star rating scale informs a consumer as to how the vehicle performed using a five star scale. For example, a NHTSA five (5) star rating would be recommended if the test-results indicated that an occupant of the vehicle had less than a ten percent (10%) chance of suffering a life-threatening injury. Conversely, a NHTSA one (1) star rating would be recommended if the test-results indicated that the occupant of the vehicle had more than a forty-five percent (45%) chance of suffering a life-threatening injury.

As such, consumers have been increasingly basing a portion of their vehicle purchase upon the published NHTSA star rating scale. The consumers may tend to avoid vehicles that fall within the lower star rating (e.g., 1-2 stars) and may base a purchase on a vehicle with a high star rating (e.g., 3-4 stars).

In response to the NHTSA star rating scale, vehicle manufacturers have continually worked to improve the crash sensing technologies (i.e., crash sensor systems). These crash sensor systems operate to continually monitor and generate vehicle crash signals. A controller receiving the crash signals makes a determination whether the vehicle has been involved in a front impact, side impact or roll-over crash. Based upon the type of crash, the controller signals that a particular safety restraint system be deployed.

For example, based upon the crash signals received, if the controller determines that the vehicle has been involved in a frontal impact crash, a pair of frontal air bags may be deployed. Likewise, if the controller determines the vehicle has been involved in a side impact crash, a pair of side curtain air bags may be deployed. However, current frontal crash sensor systems typically include some latent time delay between the occurrence of the frontal impact crash and the deployment of the frontal safety restraint system.

SUMMARY

According to a non-limiting embodiment of the present application, a crash sensor system and method may be provided that includes at least one pressure sensor coupled to a vehicle frame member. The vehicle frame member having a cavity and the at least one pressure sensor being configured to generate a pressure signal indicative of a pressure change within the cavity. The crash sensor system further including a controller configured to compare the received pressure signal against a predetermined pressure threshold. The controller also being configured to determine that a frontal impact crash has occurred when the pressure signal exceeds the predetermined pressure threshold.

DETAILED DESCRIPTION

With reference to FIGS. 1-9, a more detailed description of one or more embodiments of the present application will now be provided.

Figure 1:
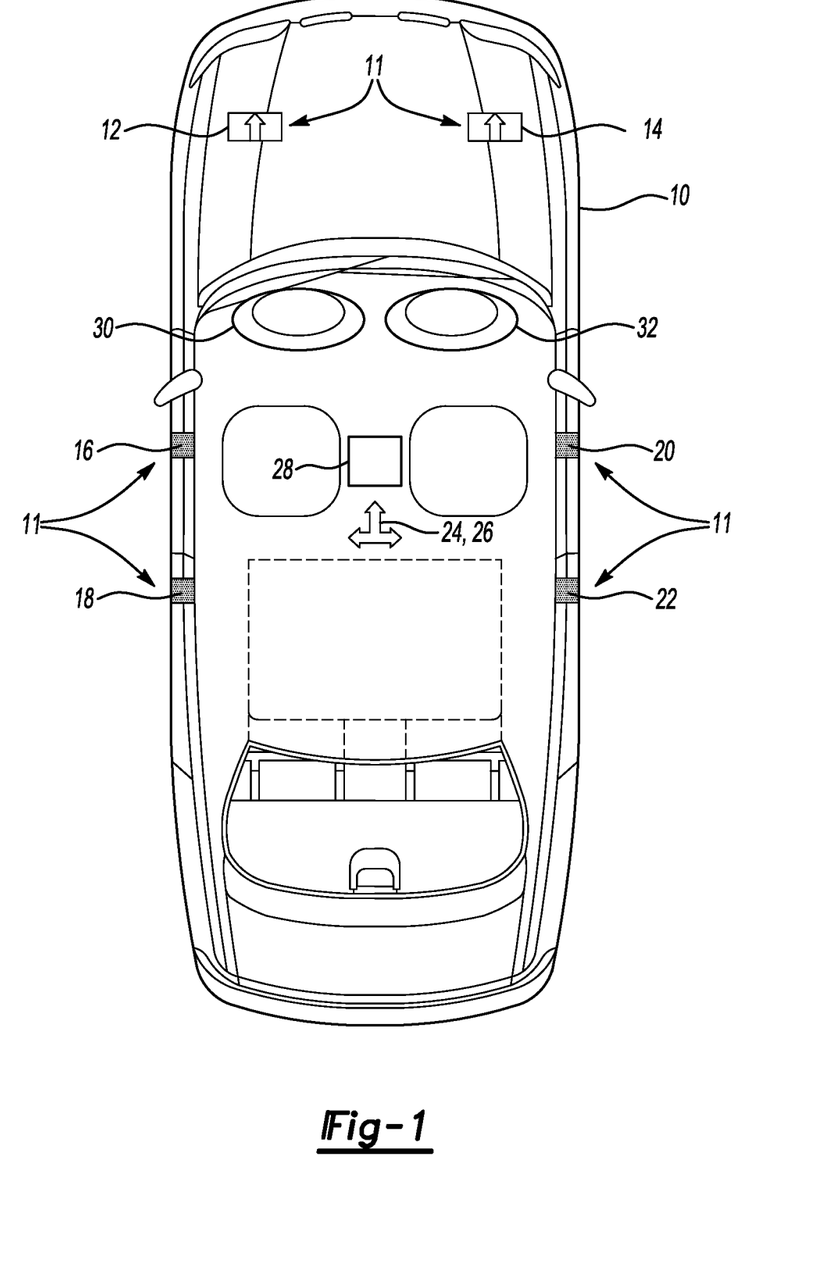
FIG. 1 is a top view of a vehicle 10 that includes a number of crash sensors.

FIG. 1 is a top view of a vehicle 10 which may include a number of crash sensors 11. More particularly, the crash sensors 11 incorporated within the vehicle 10 may include a pair of frontal longitudinal acceleration sensors (12, 14), a number of side pressure sensors (16, 18, 20, 22) and/or a central longitudinal and lateral acceleration sensor (24, 26) located at or near the center of the vehicle 10. The crash sensors 11 incorporated within the vehicle 10 may operate to generate and transmit crash signals. The vehicle 10 may further include a controller 28 that may operate to receive the crash signals and to determine whether the vehicle 10 has been involved in, but not limited to, a frontal impact, side impact, or roll-over crash. Once the type of crash is determined, the controller 28 may control a particular safety restraint system to be deployed so as to reduce injury to an occupant of the vehicle.

The crash sensors 11 included within the vehicle 10 may be assigned to monitor and transmit crash signals pertaining to a particular crash scenario. For example, the frontal longitudinal accelerometers (12, 14) may monitor and transmit acceleration signals pertaining to frontal impact crashes. The controller 28 may receive the acceleration signals transmitted by the frontal longitudinal accelerometer sensors (12, 14) and determine whether the vehicle 10 has been involved in a frontal impact crash. If the controller 28 determines that the acceleration signals received from the frontal longitudinal accelerometer sensors (12, 14) indicate that a frontal impact crash has occurred, then the controller 28 may confirm the occurrence of the frontal impact crash by monitoring the acceleration signals transmitted by the central longitudinal accelerometer sensor 24. If the frontal longitudinal accelerometer sensors (12, 14) indicate, and the central longitudinal accelerometer sensor 24 confirms, that the vehicle 10 has been involved in a frontal impact collision, then the controller 28 may deploy a front safety restraint system that includes, but is not limited to, a pair of frontal airbags (30, 32).

Figure 2:
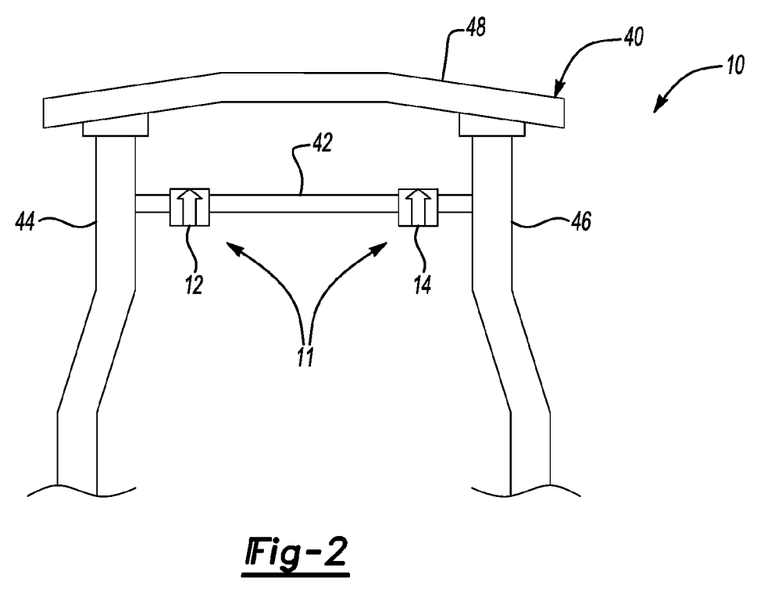
FIG. 2 is a perspective view of a front-end engine compartment of the vehicle.

FIG. 2 is a top view illustration of a front-end engine compartment 40 of the vehicle 10. As illustrated, the frontal longitudinal accelerometer sensors (12, 14) may be mounted or coupled to a securing mechanism 42 located within the front-end engine compartment 40. The securing mechanism 42 may include, but is not limited to, a fender (not shown), a radiator (not shown), or radiator support (not shown). As illustrated in FIG. 2, the securing mechanism 42 may also be securely coupled to a pair of frontal side body rails (44, 46). The securing mechanism 42 may be positioned a predetermined distance away from a front bumper 48. As such, the frontal longitudinal accelerometer sensors (12, 14) may be insulated, or protected, from the energy associated with a frontal impact crash.

As noted above in connection with FIG. 1, the frontal longitudinal accelerometer sensors (12, 14) may generate and transmit acceleration signals indicative of the vehicle 10 being involved in a frontal impact crash. However, because the frontal longitudinal accelerometer sensors (12, 14) are typically coupled to the securing mechanism 42, delay or instability may be experienced with respect to the transmission and reception of the acceleration signals. Such a condition may generally be described and illustrated in further detail with respect to FIG. 3.

Figure 3:
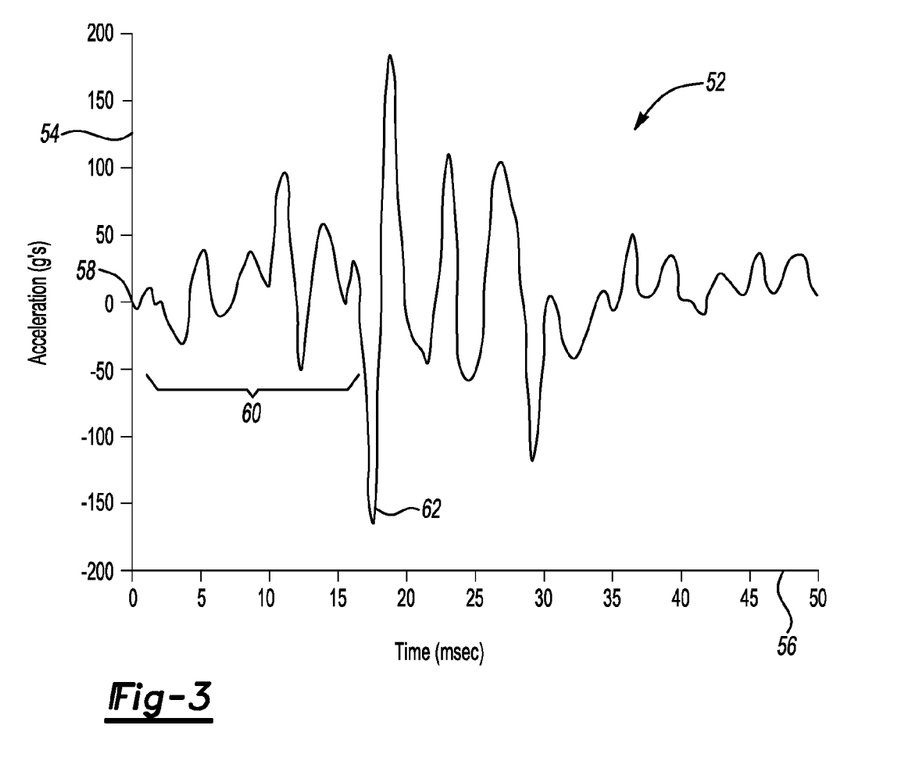
FIG. 3 is a exemplary acceleration graph according to one or more embodiments of the present application.

FIG. 3 illustrates an acceleration graph 52 that exemplifies the acceleration signal generated by the frontal longitudinal accelerometer sensors (12, 14) during a frontal impact crash. As illustrated the acceleration graph 52 includes a vertical axis 54 that is representative of the acceleration (g/s) of the vehicle 10 during a frontal impact crash. The acceleration graph 52 further includes a horizontal axis 56 that is representative of the time (msec) during the frontal impact crash.

To begin, the acceleration signal illustrated in FIG. 3 includes a time 58 which may be indicative of the time when the vehicle 10 is involved in a frontal impact crash. An acceleration time delay 60 may result between the occurrence of the frontal impact crash at the time 58 and when the pair of frontal longitudinal accelerometer sensors (12, 14) generate an acceleration signal at a time 62. As stated, the acceleration time delay 60 from the time 58 to 62 may be attributed to the front-end engine compartment 40 being designed to absorb much of the energy associated with the frontal impact crash. As such, a load path, inherently caused by the components located within the front-end engine compartment 40, results in the frontal longitudinal accelerometer sensors (12, 14) generating and/or transmitting the acceleration signal 62 after the acceleration time delay 60.

In addition, when the vehicle 10 is involved in a frontal impact crash at a lower speed (e.g., less than 12 M.P.H.) the front-end engine compartment 40 may absorb much of the energy of the frontal impact crash. As such, the acceleration crash signal generated by the pair of frontal longitudinal acceleration sensors (12, 14) may not indicate that a frontal impact crash has occurred. Thus, the controller 28 may not be able to determine that a frontal impact crash has occurred and the controller 28 may not deploy the frontal safety restraint systems.

Figure 4:
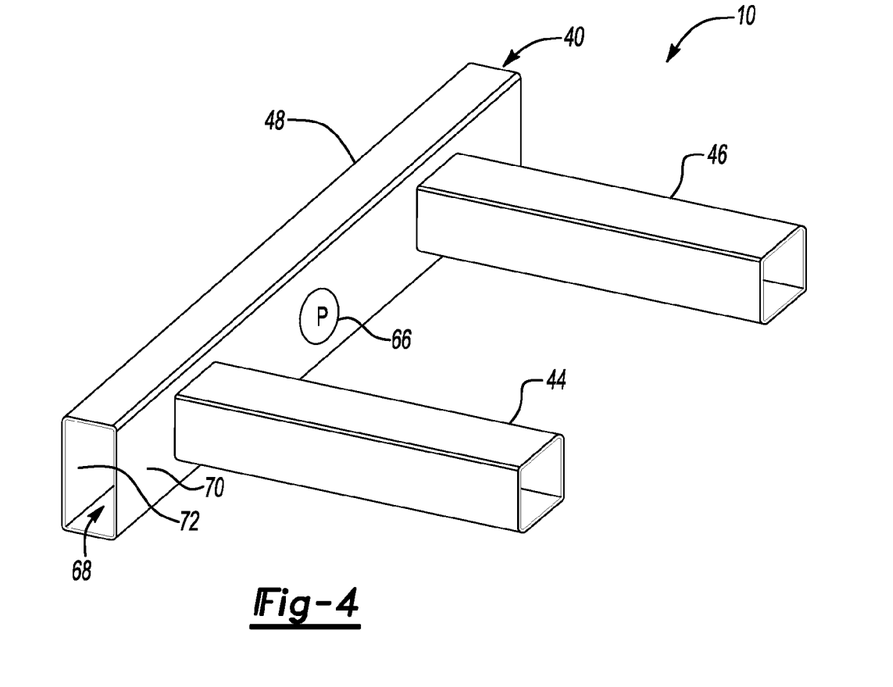
FIG. 4 is another perspective view of the front-end engine compartment of the vehicle according to one or more embodiments of the present application.

FIG. 4 illustrates the front-end engine compartment 40 of one or more embodiments of the present application. As illustrated, the front-end engine compartment 40 may include the pair of frontal side rails (44, 46). The front-end engine compartment 40 may also include a pressure sensor 66 coupled to the front bumper 48.

As is further illustrated in FIG. 4, it is generally contemplated that the front bumper 48 may be designed using a pair of "C" cross-beam member sections. When the pair of "C" cross-beam member sections are joined together, a cavity 68 may be formed between an outer wall 70 and an inner wall 72 of the front bumper 48. It is also contemplated that the front bumper 48 may also be designed using a closed beam section formation. The cavity 68 may also be formed between the outer wall 70 and the inner wall 72 of the front bumper 48 using the closed beam section formation. The pair of "C" cross-beam member sections or the closed beam section formation may be used in order to increase the stiffness, or overall rigidity of the front bumper 48.

As stated, the pressure sensor 66 may be coupled to the front bumper 48. More particularly, the pressure sensor 66 may be coupled to the inner wall 72 of the front bumper 48. The front bumper 48 may also be designed so that the cavity 68 is open at both ends. By having an opening at both ends of the front bumper 48, the cavity 68 may be substantially sealed thereby allowing a path for pressurized air to escape during a frontal impact crash. However, it is also contemplated that the front bumper 48 may also be completely sealed at both ends. As such, no path may exist for the pressurized air generated during a frontal impact crash to escape.

When the vehicle 10 is involved in a frontal impact crash, the pressure sensor 66 may generate a pressure signal indicative of a pressure change within the cavity 68. In turn, the controller 28 may receive and determine if the pressure signal exceeds a predetermined pressure threshold. If the pressure signal exceeds the predetermined pressure threshold, then the controller 28 may determine that the vehicle 10 is involved in a frontal impact crash. However, if the pressure signal does not exceed the predetermined pressure threshold, then the controller 28 may determine that the vehicle 10 is not involved in a frontal impact crash.

Figure 5:
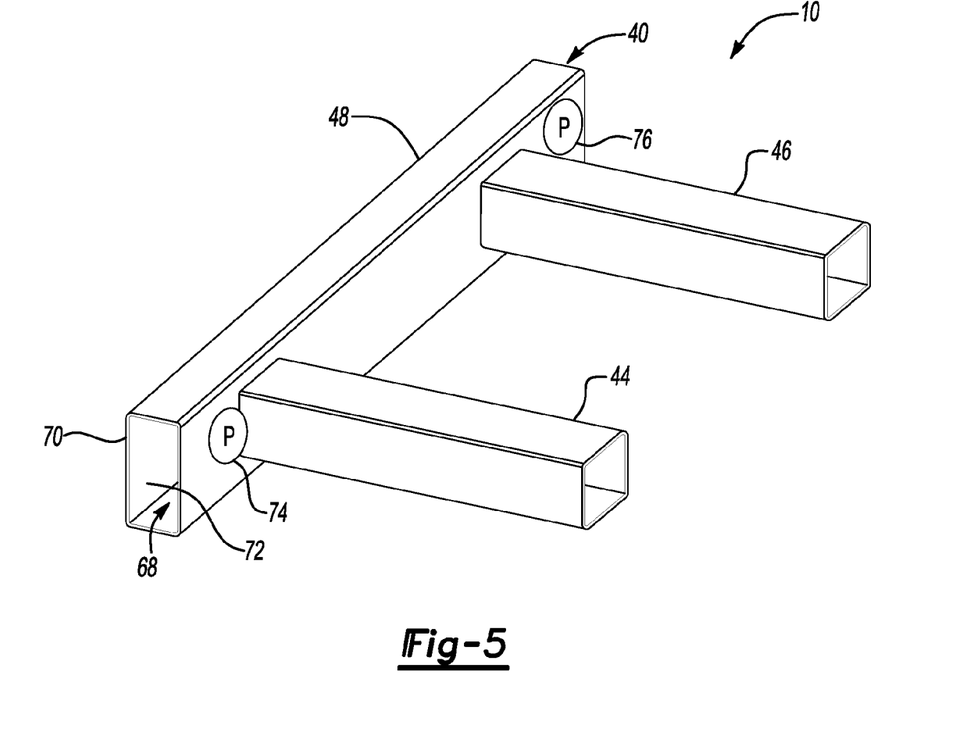
FIG. 5 is another perspective view of the front-end engine compartment of the vehicle according to one or more embodiments of the present application.

As shown in FIG. 5, one or more embodiments of the present application contemplate that the front bumper 48 may include a first and a second pressure sensor (74, 76). Thus, more than one pressure signal indicative of a pressure change within the cavity 68 of the front bumper 48 may be generated.

For example, the first pressure sensor 74 may be coupled to a driver side of the front bumper 48. Moreover, the second pressure sensor 76 may be coupled to a passenger side of the front bumper 48. If the vehicle 10 is involved in a frontal impact crash, then the first pressure sensor 74 may generate a first pressure signal indicative of the pressure change within the cavity 68 located on the driver side of the front bumper 48. In addition, the second pressure sensor 76 may generate a second pressure signal indicative of the pressure change within the cavity 68 located on the passenger side of the front bumper 48.

The controller 28 may receive the first and second pressure signals and determine if the difference between the first and second pressure signals exceeds a predetermined pressure threshold. If so, the controller 28 may determine that the vehicle is involved in a frontal impact crash. The controller 28 may further compare the first and second pressure signals to a crash severity threshold in order to determine whether the frontal impact crash occurred on the driver or passenger side of the vehicle 10. For example, if the first pressure signal exceeds the crash severity threshold, the controller 28 may determine the vehicle is involved in a frontal impact crash occurring on the driver side of the vehicle. However, if the second pressure signal exceeds the crash severity threshold, then the controller 28 may determine the vehicle 10 is involved in a frontal impact crash occurring on the passenger side of the vehicle 10. One or more embodiments of the present application further contemplate that if the difference between the first and second pressure signals do not exceed the predetermined pressure threshold, and both the first and second pressure signals exceed the crash severity threshold, then the controller 28 may determine that the vehicle 10 is involved in frontal impact crash occurring on a central portion of the vehicle 10 (e.g., a full frontal impact crash). It is noted that any number of pressure sensors may be positioned on the front bumper 48 and that the number of pressure sensors positioned thereon may vary based on the desired criteria of a particular implementation.

Figure 6:
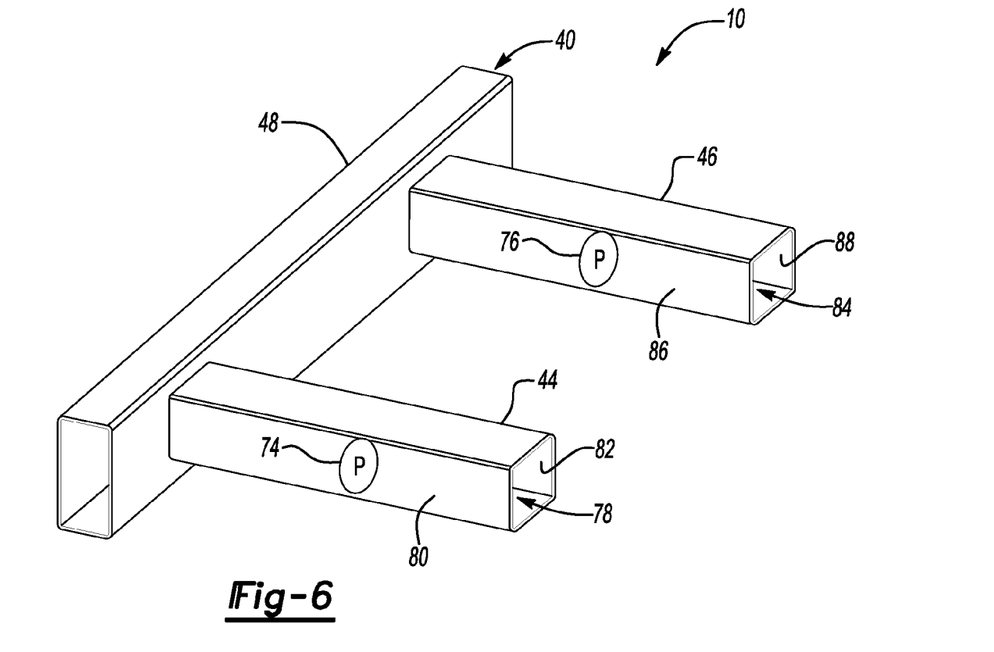
FIG. 6 is another perspective view of the front-end engine compartment of the vehicle according to one or more embodiments of the present application.

As shown in FIG. 6, it is generally contemplated that the first and second pressure sensors (74, 76) may be coupled to the pair of frontal side body rails (44, 46). Similar to the front bumper 48, the pair of frontal side body rails (44, 46) may be designed using a pair of "C" cross-beam member sections or a closed beam section formation. As such, a first cavity 78 may be formed between an outer wall 80 and an inner wall 82 of the first frontal side body rail 44. Also, a second cavity 84 may be formed between an outer wall 86 and an inner wall 88 of the second frontal side body rail 46. The first pressure sensor 74 may be coupled to the inner wall 82 of the first frontal side body rail 44 and may generate a first pressure signal indicative of a pressure change within the cavity 78 on the driver side of the vehicle 10. Moreover, the second pressure sensor 76 may be coupled to the inner wall 88 of the second frontal side body rail 46 and may generate a second pressure signal indicative of a pressure change within the cavity 84 on the passenger side of the vehicle 10.

The controller 28 may receive the first and second pressure signals and determine if the difference between the first and second pressure signals exceeds a predetermined pressure threshold. If so, the controller 28 may determine the vehicle is involved in a frontal impact crash. The controller may further compare the first and second pressure signals to a crash severity threshold in order to determine whether the frontal impact crash occurred on the driver or passenger side of the vehicle 10. If the first pressure signal exceeds the crash severity threshold, then the controller 28 may determine the vehicle is involved in a frontal impact crash occurring on the driver side of the vehicle. If on the other hand, the second pressure signal exceeds the crash severity threshold, then the controller 28 may determine the vehicle is involved in a frontal impact crash occurring on the passenger side of the vehicle. One or more embodiments of the present application further contemplate that if the difference between the first and second pressure signals do not exceed the predetermined pressure threshold, and both the first and second pressure signals exceed the crash severity threshold, then the controller 28 may determine that the vehicle 10 is involved in frontal impact crash occurring on a central portion of the vehicle 10 (e.g., a full frontal impact crash).

Figure 7:
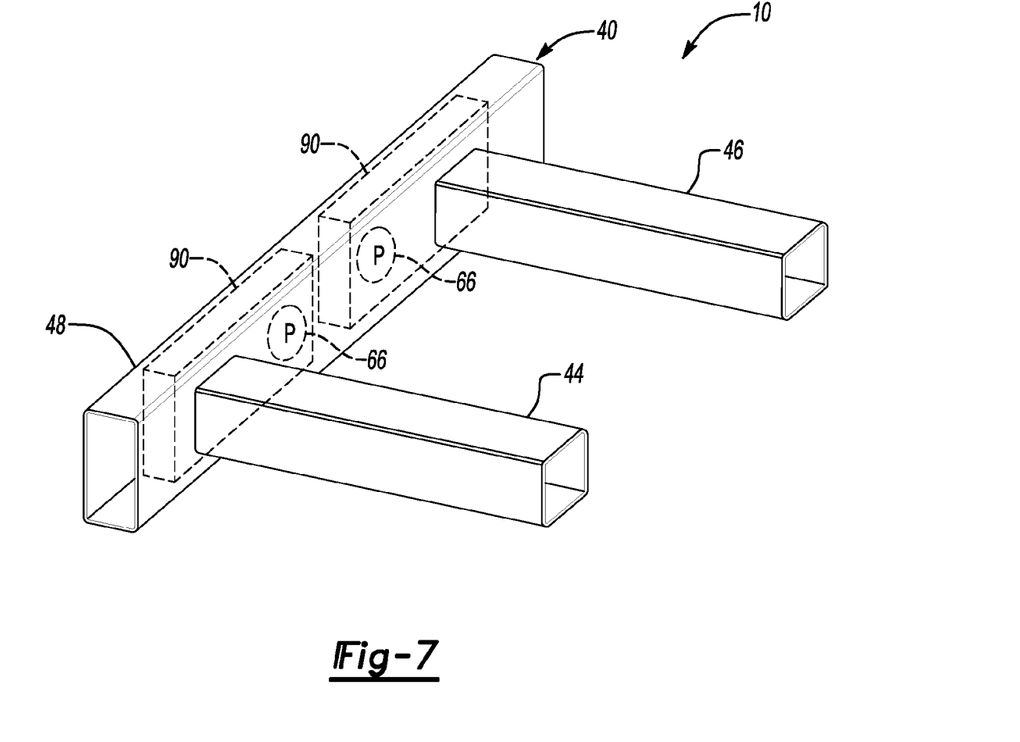
FIG. 7 is another perspective view of the front-end engine compartment of the vehicle according to one or more embodiments of the present application.

FIG. 7 illustrates another alternative embodiment of the present application. As illustrated, the front bumper 48 may be designed to include one or more sealed chambers 90. Alternatively, the one or more sealed chambers 90 may be constructed separately and may be inserted into the front bumper 48. The pressure sensors 66 may be coupled to the one or more sealed chambers 90 and may operate to generate and transmit pressure signals indicative of a pressure change within the one or more sealed chambers 90. It is generally contemplated that the pressure sensors 66 that are coupled to the one or more sealed chambers 90 may generate a more acute pressure signal than the pressure signal described with reference to FIGS. 4-6. As such, by coupling the pressure sensors 66 to the one or more sealed chambers 90 a more accurate determination of a frontal impact crash may result.

It is also generally contemplated that the pressure sensors 66 may generate a pressure signal indicative of the location on the front bumper 40 upon which the frontal impact crash occurs. For example, if the vehicle 10 is involved in a frontal impact crash occurring along the driver side portion of the vehicle 10, an increase in pressure may occur in one or more of the sealed chambers 90 located on the driver's side of the vehicle 10. In turn, the attached pressure sensors 66 may generate and transmit pressure signals indicative of the increased pressure change. The controller 28 may receive these pressure signals and may determine that the vehicle 10 has been involved in a frontal impact crash occurring on the driver's side of the vehicle 10.

It is generally contemplated that the one or more sealed chambers 90 may also be included within the pair of frontal side rails (44, 46). It is also noted that any number of pressure sensors (74, 76) may be coupled to the one or more sealed chambers 90 and may operate to generate and transmit pressure signals indicative of pressure changes within the one or more sealed chambers 90.

Figure 8:
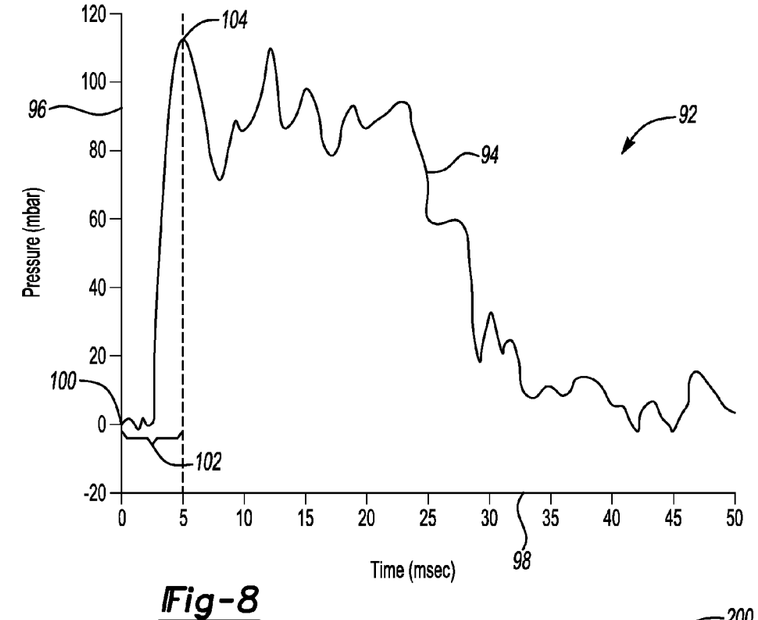
FIG. 8 is a exemplary pressure graph according to one or more embodiments of the present application.

FIG. 8 depicts an illustrative pressure graph 92 of a pressure signal 94 generated by the pressure sensor 66 when the vehicle 10 is involved in a frontal impact crash. As illustrated, the pressure graph 92 may include a vertical axis 96 that is representative of the pressure (mbar) of the vehicle 10 during a frontal impact crash. The pressure graph 92 may further include a horizontal axis 98 that is representative of the time (msec) during the frontal impact crash.

The pressure signal 94 may include a start time 100 and a pressure time delay 102. The pressure signal 94 may further include a time 104 indicative of the occurrence of a frontal impact crash. As illustrated, the pressure time delay 102 may be smaller than the acceleration time delay 60 illustrated in the acceleration graph 52. As such, the pressure signal 94 may be generated at a time closer to the actual occurrence of the frontal impact crash. By incorporating pressure sensors into the front bumper 48 or into the pair of frontal side rails (44, 46), the pressure signal generated during the occurrence of a frontal impact crash may be more responsive than the acceleration signal generated by the frontal longitudinal acceleration sensors (12, 14). Thus, the controller 28 may deploy the frontal restraint safety system at a time closer to the actual occurrence of the frontal impact crash.

Figure 9:
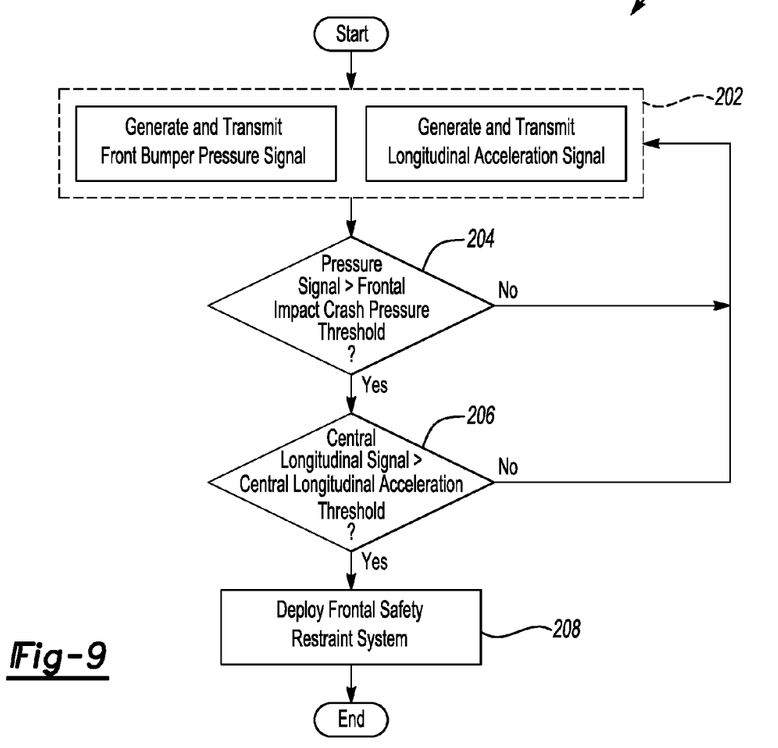
FIG. 9 is an exemplary flow diagram according to one or more embodiments of the present application.

With reference back to the drawings, FIG. 9 is an exemplary, flow diagram 200 according to one or more embodiments of the present application. In operation 202, the pressure sensor 66 generates and transmits the pressure signal. In addition, the central longitudinal acceleration sensor 24 and/or 26 may generate an acceleration signal. It is generally contemplated that the acceleration signal transmitted by the central longitudinal acceleration sensor 24 and/or 26 may correspond to a longitudinal acceleration about a center of gravity of the vehicle 10. Once the pressure signal and/or the central longitudinal acceleration signal are generated and transmitted, the flow diagram 200 proceeds to operation 204.

In operation 204, the controller 28 may determine if the pressure signal exceeds a predetermined pressure threshold. If the pressure signal does not exceed the predetermined pressure threshold, then the flow diagram 200 may return back to operation 202. However, if the pressure signal does exceed the predetermined pressure threshold, the flow diagram 200 may proceed to operation 206.

In operation 206, the controller 28 may confirm whether the vehicle 10 has been involved in a frontal impact crash. The controller 28 may confirm the occurrence of the frontal impact crash by determining if the acceleration signal exceeds a predetermined acceleration threshold. If the acceleration signal does not exceed the predetermined acceleration threshold, then the flow diagram 200 proceeds back to operation 202. However, if the acceleration signal does exceed the predetermined acceleration threshold, then the flow diagram 200 proceeds to operation 208.

In operation 208, the controller 28 may control one or more frontal safety restraint systems. More particularly, the controller 28 may be configured to control and deploy the pair of frontal airbags (30, 32) when it is determined that the vehicle 10 is involved in a frontal impact crash.

While embodiments of the present application may have been illustrated and the described is not intended those embodiments illustrate and describe the only embodiments of the present application. Rather, the words used in the above application are words of description rather than limitations and it should be understood that changes may be made to the above description without departing from the spirit and scope of the application. As such, specifically details disclosed are merely representative basis for teaching one skilled in the art to practice the present application.

What is claimed:

1. A crash sensor system for a vehicle, the system comprising:
   a vehicle frame member having an inner and outer wall
   at least one sealed cavity formed within the inner and outer walls of the vehicle frame member;
   at least one pressure sensor positioned within the at least one cavity, the at least one pressure sensor being configured to generate a pressure signal indicative of a pressure change within the cavity; and
   a controller configured to:
     receive the pressure signal;
     compare the pressure signal to a predetermined pressure threshold; and
     determine an occurrence of a frontal impact crash in response to the pressure signal exceeding the predetermined pressure threshold.

2. The crash sensor system of claim 1 further comprising an accelerometer sensor positioned proximate or in center of the vehicle and being configured to generate an acceleration signal with respect to a center of gravity of the vehicle.

3. The crash sensor system of claim 2, wherein the controller is further configured to:
   receive the accelerometer signal;
   compare the acceleration signal to a predetermined acceleration threshold;
   determine when the acceleration signal exceeds the predetermined acceleration threshold; and
   confirm the occurrence of the frontal impact crash when the pressure signal exceeds the predetermined pressure threshold and the acceleration signal exceeds the predetermined acceleration threshold.

4. The crash sensor system of claim 3, wherein the controller is further configured to deploy a front safety restraint system in response to the pressure signal exceeding the predetermined pressure threshold and the acceleration signal exceeding the predetermined acceleration threshold.

5. The crash sensor system of claim 1, wherein the vehicle frame member is a front bumper having an outer wall facing a front of the vehicle and an inner wall facing a rear of the vehicle, and the pressure sensor being coupled to the inner wall.

6. The crash sensor system of claim 5 further comprising a first and second pressure sensors, wherein the first pressure sensor is coupled to the inner wall and positioned on a driver side of the front bumper and the second pressure sensor is coupled to the inner wall located and positioned on a passenger side of the front bumper, and wherein the first and second pressure sensor are configured to generate first and second pressure signals, respectively, indicative of a pressure change within the cavity.

7. The crash sensor system of claim 6, wherein the controller is further configured to:
   receive the first and second pressure signals;
   determine a difference between the first and the second pressure signals;
   determine that the vehicle is involved in a frontal impact crash when the difference between the first pressure signal and the second pressure signal exceeds a predetermined pressure threshold.

8. The crash sensor system of claim 7, wherein the controller is further configured to:
   compare the first and second pressure signals to a crash severity threshold;
   determine that the vehicle is involved in a frontal impact crash occurring on the driver side in response to the first pressure signal exceeding the crash severity threshold; and
   determine that the vehicle is involved in a frontal impact crash occurring on the passenger side in response to the second pressure signal exceeding the crash severity threshold.

9. The crash sensor system of claim 8, wherein the controller is further configured to:
   determine that the vehicle is involved in a frontal impact crash occurring on a central portion of the vehicle in response to the difference between the first pressure signal and the second pressure signal not exceeding the predetermined pressure threshold, and in response to the first pressure signal and the second pressure signal exceeding the crash severity threshold.

10. The crash sensor system of claim 1, wherein the vehicle frame member further comprises a pair of frontal side body rails and wherein each vehicle side body rail includes an outer wall facing away from the vehicle and an inner wall facing toward the vehicle.

11. The crash sensor system of claims 10 further comprising a first and second pressure sensors, wherein the first pressure sensor is coupled to the inner wall of the vehicle side body rail located on a driver side of the vehicle, wherein the second pressure sensor is coupled to the inner wall of the vehicle side body rail located on a passenger side of the vehicle, and wherein first and second pressure sensors are configured to generate first and second pressure signals, respectively, indicative of a pressure change within the cavity of each inner wall.

12. The crash sensor system of claim 11, wherein the controller is further configured to:
   receive the first and second pressure signals;
   determine a difference between the first and the second pressure signals;
   determine that the vehicle is involved in a frontal impact crash when the difference between the first pressure signal and the second pressure signal exceeds a predetermined pressure threshold;
   compare the first and second pressure signals to the crash severity threshold;
   determine that the vehicle is involved in a frontal impact crash occurring on the driver side in response to the first pressure signal exceeding the crash severity threshold; and
   determine that the vehicle is involved in a frontal impact crash occurring on the passenger side in response to the second pressure signal exceeding the crash severity threshold.

13. A crash sensor system for a vehicle, the system comprising:
   a frontal vehicle frame member having an inner and outer wall;
   a side vehicle frame member having an inner and outer wall;

a first sealed cavity formed within the inner and outer walls of the frontal vehicle frame member and a second sealed cavity formed within the inner and outer walls of the side vehicle frame member; and a first pressure sensor positioned within the first sealed cavity and a second pressure senor positioned within the second sealed cavity, the first and second pressure sensors being configured to a generate a first and pressure signal indicative of a pressure change within the first cavity and a second pressure signal indicative of a pressure change within the second cavity; and a controller configure to:
 receive the first and second pressure signal;
 compare the first and second pressure signals to a first and second predetermined pressure threshold;
 determine an occurrence of a frontal impact crash in response to the first pressure signals exceeding the first predetermined pressure threshold; and
 determine an occurrence of a side impact crash in response to the second pressure signal exceeding the second predetermined pressure threshold.

14. The crash sensor system of claim 13 further comprising an accelerometer sensor positioned proximate or in the center of the vehicle, and the accelerometer sensor being configured to generate a longitudinal acceleration signal with respect to a center of gravity of the vehicle.

15. The crash sensor system of claim 14, wherein the controller is further configured to:
 receive the accelerometer signal;
 compare the acceleration signal to a predetermined acceleration threshold; and
 determine when the acceleration signal exceeds the predetermined acceleration threshold; and
 confirm the occurrence of the frontal impact crash when the pressure signal exceeds the predetermined pressure threshold and the acceleration signal exceeds the predetermined longitudinal threshold.

16. The crash sensor system of claims 15, wherein the controller is further configured to deploy a front safety restraint system in response to the pressure signal exceeding the predetermined pressure threshold and the acceleration signal exceeding the predetermined acceleration threshold.

17. The crash sensor system of claims 13, wherein the vehicle frame member is a front bumper having an outer wall facing a front of the vehicle and an inner wall facing a rear of the vehicle.

18. The crash sensor system of claims 17 further comprising:
 at least two sealed chambers, wherein at least a first sealed chamber is located within a driver side of the front bumper, and at least a second sealed chamber is located within a passenger side of the front bumper;
 at least two pressure sensors, wherein the at least first pressure sensor is coupled to the sealed chamber located on a driver side of the front bumper, and the at least second pressure sensor is coupled to the sealed chamber located on a passenger side of the front bumper, the at least first pressure sensor being configured to generate a first pressure signal indicative of a pressure change within the first sealed chamber, and the at least second pressure sensor being configured to generate a second pressure signal indicative of a pressure change within the second sealed chamber; and the controller further configured to:
 receive the first and the second pressure signals;
 determine a difference between the first and the second pressure signals;
 determine that the vehicle is involved in a frontal impact crash when the difference between the first pressure signal and the second pressure signal exceeds a predetermined pressure threshold;
 compare the first and second pressure signals to crash severity threshold threshold;
 determine that the vehicle is involved in a frontal impact crash occurring on the driver side in response to the first pressure signal exceeding the crash severity threshold; and
 determine that the vehicle is involved in a frontal impact crash occurring on the passenger side in response to the second pressure signal exceeding the crash severity threshold.

19. A method for determining the occurrence of a frontal impact crash of a vehicle, the method comprising:
 generating a pressure signal with a pressure sensor that is positioned within a seal cavity, the sealed cavity being formed within an inner and outer wall of a vehicle frame member, the pressure signal being indicative of a pressure change within the cavity of the vehicle frame member;
 comparing the pressure signal to a predetermined pressure threshold; and
 determining an occurrence of a frontal impact crash in response to the pressure signal exceeding the predetermined pressure threshold.

20. The method of claim 19 further comprising:
 generating an acceleration signal with an accelerometer sensor positioned proximate or in a center of the vehicle, the acceleration sensor being configured to generate the acceleration signal with respect to a center of gravity of the vehicle;
 comparing the acceleration signal to a predetermined acceleration threshold;
 determining whether the acceleration signal exceeds the predetermined acceleration threshold; and
 confirming the occurrence of the frontal impact crash in response to the pressure signal exceeding the predetermined pressure threshold and the acceleration signal exceeding the predetermined acceleration threshold.

* * * * *